United States Patent [19]

Skala

[11] 4,156,454
[45] May 29, 1979

[54] OVEN WITH REFRIGERATED FOOD STORAGE BASED ON THERMAL EXCHANGE FLUID

[76] Inventor: Stephen F. Skala, 3839 S. Wenonah Ave., Berwyn, Ill. 60402

[21] Appl. No.: 792,455

[22] Filed: Apr. 29, 1977

Related U.S. Application Data

[63] Continuation-in-part of Ser. No. 299,294, Oct. 4, 1972, Pat. No. 3,888,303, and a continuation-in-part of Ser. No. 576,447, May 12, 1975, abandoned.

[51] Int. Cl.² .................... F25B 13/00; F25B 29/00
[52] U.S. Cl. .......................................... 165/2; 165/12; 165/18; 165/26; 165/50; 165/61; 99/324; 99/326; 99/332
[58] Field of Search ............... 165/2, 12, 14, 18, 26, 165/50, 61, 17; 99/326, 332; 62/185, 234, 376, 434, 435, 451, 82, 282

[56] References Cited

U.S. PATENT DOCUMENTS

| | | | |
|---|---|---|---|
| 3,237,415 | 3/1966 | Newton | 62/185 X |
| 3,267,689 | 8/1966 | Liebert | 62/282 X |
| 3,608,627 | 9/1971 | Shevlin | 165/2 |
| 3,952,794 | 4/1976 | Spanoudis | 165/2 |

*Primary Examiner*—Charles J. Myhre
*Assistant Examiner*—Margaret LaTulin

[57] ABSTRACT

An oven, which maintains food at a low temperature to preserve its properties for subsequent unattended cooking at high oven temperatures, is cooled and heated by a flowing liquid thermal exchange fluid which is cooled and heated by flowing through thermal sources separate from the oven. Within a food processing compartment of the oven, heat is exchanged between an enclosed chamber heat exchanger and the food by air convection.

In a preferred embodiment, the oven is one of a plurality of domestic appliances similarly heated and cooled by a liquid thermal exchange fluid. The oven and the other appliances share in common an assembly of thermal reservoirs which provides thermal exchange fluid under pressure at substantially the temperatures of the thermal reservoirs which include a hot and a cold reservoir. The oven controls heating and cooling of the food processing compartment by positioning selector valves which admit thermal exchange fluid from one of the thermal reservoirs and by adjusting a regulator valve to control flow through the enclosed chamber. The selector and regulator valves are controlled in response to a computer and a temperature sensor to attain predetermined temperature levels in the food processing compartment which include cold to preserve food properties and hot to desirably alter the food properties.

9 Claims, 1 Drawing Figure

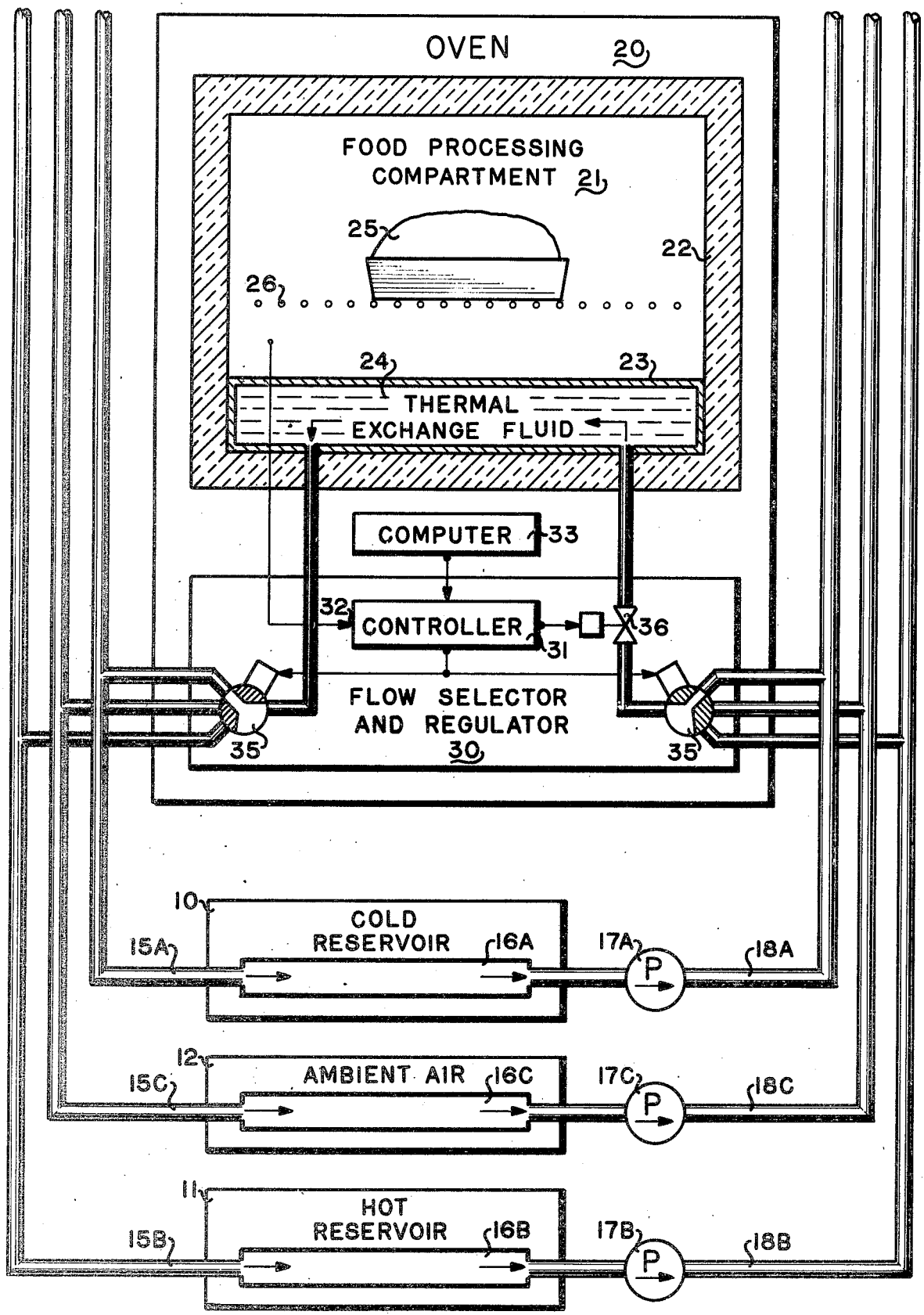

OVEN WITH REFRIGERATED FOOD STORAGE BASED ON THERMAL EXCHANGE FLUID

This application is a continuation-in-part of Ser. No. 299,294 filed Oct. 4, 1972, now U.S. Pat. No. 3,888,303; and is now a continuation-in-part of Ser. No. 576,447 filed May 12, 1975 and now abandoned.

CROSS-REFERENCES TO RELATED APPLICATIONS

Ser. No. 577,109 entitled Forced Air Range with Thermal Exchange Fluid, now U.S. Pat. No. 4,024,904.

Ser. No. 839,618 entitled Domestic Appliance System with Thermal Exchange Fluid.

Ser. No. 756,392 entitled Hot Reservoir System for Intermittent Users.

Ser. No. 769,389 entitled Pressure Cooking System with Thermal Exchange Fluid.

Ser. No. 792,456 entitled Freezer or Refrigerator with Cooling and Defrosting by Thermal Exchange Fluid, now abandoned.

BACKGROUND OF THE INVENTION

This invention relates to refrigerated storage and subsequent oven processing of food and more particularly it relates to such processing in oven appliances which are cooled and heated by a liquid thermal exchange fluid.

This invention and the inventions of the above cross-references relate to various aspects of a novel system of domestic appliances wherein heat is exchanged between a plurality of appliances and a plurality of thermal reservoirs by forced circulation of a liquid phase thermal exchange fluid between a heat exchanger in an appliance selected for operation and a heat exchanger in a thermal reservoir selected for heating or cooling the thermal exchange fluid.

A thermal reservoir assembly, commonly shared by the appliances, comprises the thermal reservoirs each heating or cooling thermal exchange fluid in a reservoir heat exchanger which is connected through a pump to a supply and return main pair to which the appliances connect. Included among the thermal reservoirs are a hot reservoir maintained above oven cooking temperatures by a heat storing material having a large heat of crystallization at a high temperature, a cold reservoir maintained below refrigerator and freezer temperatures by a heat storing material having a large heat of fusion at a low temperature, and a heat sink at outdoor ambient temperature.

An appliance heat exchanger connects to the plurality of supply and return main pairs through a pair of selector valves. An appliance regulator valve then modulates flow of thermal exchange fluid from the selected supply and return main pair. Temperature within an appliance is regulated precisely over a range of cooking and freezing temperatures by a programmed operation of the selector and regulator valves.

The thermal reservoirs are charged at moderate power levels during off-peak hours and are able to provide large quantities of thermal energy during periods of peak appliance use. Energy conservation is enhanced by use of the ambient outdoor air heat sink to moderate appliance temperature during transitions between hot and cold to reduce thermal loading of the hot and cold reservoirs.

Some appliance units may be connected to only one of the supply and return main pairs to provide either heating or cooling. A sink appliance supplying hot water for instant hot beverages which regulates flow of hot thermal exchange fluid is an example. But the marginal cost of selector valves to connect an appliance to all of the supply and return main pairs is small. Accordingly, it is economical for an appliance of this system to provide both heating and cooling capability together with temperature moderation by ambient air.

Domestic unattended cooking is attained by refrigerated storage of food for subsequent programmed processing and completion at a specified time. Such refrigerated storage and cooking has been practiced in vending, catering, and restaurant applications, but has been too complex or too specialized for use in homes. One process, for example, transfers a food package from a cold zone to a hot zone by conveyer means.

In another process more adaptable to a smaller scale disclosed by T. S. Shevlin in U.S. Pat. No. 3,608,627, a refrigerator contains a plurality of insulated food containers or casseroles which are heated automatically and individually by heating elements. The system is still complex, however, in that a refrigeration unit, heating elements, and separate controllers are required. Further, the range of cooking processes in a casserole type container having food in thermal contact with a heat source is more limited than that of an oven configuration where food is heated by air convection. An oven, for example, can bake bread as well as heat casseroles.

Oven type structures having both refrigeration units and heating elements are used in laboratory testing applications. The oven, comprising an insulated compartment with heating and cooling means, has a heat exchanger to receive a controlled flow of a refrigerant fluid for cooling and it also has electrical heating elements which may be controlled to provide high oven temperatures. Even if such an oven unit shared with other units a common refrigerant source, an oven unit with both heat exchanger and heating element structures each with their control means would still be inappropriately complex and costly if adapted to domestic food processing functions.

In yet another process for refrigerating and subsequently cooking food disclosed by F. I. Bemiss et al. in U.S. Pat. No. 3,242,980, supply and return ducts provide cold and hot air for portable insulated food cabinets. Air at temperatures regulated by valves flows from a supply duct, over food, and to a return duct. System features of shared sources of heat and cold and simple food cabinet structure contribute to system economy. Entrainment of cooking odors and vapors in circulating hot air, however, would be undesireable in diverse domestic cooking.

Ovens conventionally provide a hot atmosphere in which food is immersed for such cooking functions as roasting or baking. The temperature within the oven is normally sufficient to result in desirable nonreversible alterations of food properties by thermal processes which occur over relatively short exposure times, typically of about an hour. Such alterations of food properties are based on molecular changes, such as carbonization in surface browning, which occur at reasonable rates at higher temperatures, typically above 275° F.

OBJECTS OF THE INVENTION

It is a general object of this invention to provide an improved oven with refrigerated food storage for unattended domestic cooking.

It is another object to provide a simple and economical oven appliance unit which provides both cooling and heating functions by passing a cold or hot liquid thermal exchange fluid through a single enclosed chamber heat exchanger within the oven.

SUMMARY OF THE INVENTION

These and other objects and advantages which will become apparent are attained by this invention wherein an insulated food processing compartment includes a single enclosed chamber heat exchanger through which liquid thermal exchange fluid can flow under pressure at temperatures which include cold for preserving food for a convenient predetermined time and also include hot for cooking the food at hot oven temperatures. The thermal exchange fluid is a single substance which varies only in temperature and remains in a liquid phase as it absorbs or looses heat by flowing through heating or cooling means separate from the food processing compartment and by flowing through the enclosed chamber. The food is positioned in the food processing compartment in an oven configuration wherein the food is separate from the enclosed chamber to be cooled or heated by convection of gases between the food and the enclosed chamber. Unattended cooking is attained by programming a computer to provide temperature set points which are maintained in the oven by controlling valves to select hot or cold thermal exchange fluid and to regulate its flow.

In its preferred embodiment, the present invention is part of the domestic appliance system described briefly in the Background. It accordingly shares with a plurality of other applicance units common assemblies which deliver thermal exchange fluid at hot and cold temperatures to the appliance units. The common assemblies include as fluid circuit components a supply and return main pair connected by a reservoir heat exchanger and a pump. One fluid circuit reservoir heat exchanger is in a heat exchange relationship with a cold reservoir to provide cold thermal exchange fluid for a cold supply and return main pair. Similarly, another reservoir heat exchanger in a heat exchange relationship with a hot reservoir provides hot thermal exchange fluid for a hot supply and return main pair. The hot reservoir is preferably maintained at about +300° C. and is at least at hot oven temperature sufficient to desirably alter properties of food in a cooking process. The domestic appliance system preferably also includes another fluid circuit having a reservoir heat exchanger in a heat exchange relationship with outside ambient air or other convenient heat sink to moderate appliance temperature. Advantages over conventional appliances of the present invention deriving from use of the common assemblies of the domestic appliance system include large thermal capacity during peak use periods, economical charging of the hot and cold reservoirs at moderate power levels during off-peak hours, and removal from the kitchen of residual oven heat by the ambient air heat sink.

The oven appliance of the present invention connects to supply and return main pairs containing thermal exchange fluid under pressure at hot, cold and ambient temperatures to complete the fluid circuits of the domestic appliance system. Connecting to the supply mains is one selector valve which connects in series to a regulator valve, the enclosed chamber, and another selector valve which connects to the return mains. The oven operates by positioning the two selector valves to admit thermal exchange fluid from one of the supply and return main pairs and by adjusting the regulator valve to modulate flow in response to food processing compartment temperature. Air convection then exchanges heat between the enclosed chamber and the food. The oven per se is passive in that it only controls flow of thermal exchange fluid which developed pressure and thermal energy in external and common assemblies. The oven's low operating power level and simple structure of its fluid circuit result in an economical assembly. The economical assembly results in a low marginal cost for oven units so that a plurality of such oven units can be included in the appliance system to allow unattended individual processing of several courses of a meal simultaneously. Each course is stored at its preservation temperature and is processed at a predetermined time according to temperature-time conditions most appropriate for desirably altering properties of the contained course and for proper high or low serving temperature at a specified meal time. Advantages over conventional ovens of the present invention in addition to those deriving from use of the common assemblies of the domestic appliance system are heating and cooling at low operating power levels with simple and economical assemblies, large heat exchange surface for effective heat transfer without local hot spots to reduce smoke and odors, and temperature control programs selectable for rapid temperature transitions or for precise oven temperature by modulating flow of thermal exchange fluid for an enclosed chamber temperature at selected levels between thermal reservoir temperatures.

DESCRIPTION OF THE PREFERRED EMBODIMENT

The drawing shows a diagrammatic sectional view of the improved oven and it shows as a schematic diagram means to select and to regulate circulation of thermal exchange fluid between the oven and thermal reservoirs.

A system which includes thermal reservoirs, heat exchangers, pumps, and supply and return mains for conditioning temperature of thermal exchange fluid and for delivering the thermal exchange fluid to domestic appliances is designated by reference numerals 10 through 18 and is described in more detail in cited copending applications Ser. Nos. 839,618 and 756,392. Briefly, cold reservoir 10 preferably comprises the following components, not shown: an insulated vessel containing a low freezing point solution of water and ethylene glycol, a refrigeration unit with its evaporation coils immersed in the water solution, and a thermostatically controlled power source to operate the refrigeration unit at off-peak hours to freeze the water solution. Latent heat of fusion of the frozen water solution provides thermal capacity at a stable temperature during periods of use. Hot reservoir 11 preferably comprises the following components, not shown: an insulated vessel containing an alkali hydroxide mixture having a suitable melting point, a heating element which exchanges heat with the alkali hydroxide mixture, and a thermostatically controlled power source to operate the heating element at off-peak hours to melt the alkali hydroxide mixture. Latent heat of fusion of the alkali hydroxide mixture provides thermal capacity at a stable temperature during periods of use. Ambient air heat sink 12 preferably comprises the following components, not shown: a duct with dampers to select air exhaust or recirculation into the kitchen and a heat exchanger 16C and blower within the duct. The ambient air heat sink is used principally to moderate the temperature of an appliance and its contained thermal exchange fluid before a transition between hot and cold temperatures to conserve thermal energy stored in the hot and cold reservoirs and to remove heat remaining in an appliance after use from a kitchen in warm weather.

Cold thermal exchange fluid is provided for appliances at a differential pressure by apparatus which comprises a return main 15A, a heat exchanger 16A in the cold reservoir, a pump 17A, and a supply main 18A. Similarly, hot thermal exchange fluid is provided by a return main 15B, a heat exchanger 16B in the hot reservoir, a pump 17B, and a supply main 18B. Also similarly, thermal exchange fluid at approximately ambient air temperature is provided by a return main 15C, a heat exchanger 16C in thermal contact with ambient air, a pump 17C, and a supply main 18C.

An oven 20 is heated or cooled by selecting and regulating flow of thermal exchange fluid from the assemblies 10 through 18 just described. A food processing compartment 21 surrounded by thermal insulating material 22 includes an enclosed chamber 23 which functions as a heat exchanger through which liquid phase thermal exchange fluid 24 can flow. Food 25 positioned on grid 26 separate from the enclosed chamber is heated or cooled by convection of gases within the food processing compartment between the food and the enclosed chamber. The oven as shown exchanges heat with food by natural convection and the enclosed chamber is a double walled plate type heat exchanger. The oven may alternatively exchange heat with the food by convection forced by a fan and the enclosed chamber may be a finned tube heat exchanger.

A flow selector and regulator 30 comprises a servo system for regulating oven temperature by controlling thermal exchange fluid flowing through the enclosed chamber. Controller 31 has inputs from a temperature sensor 32 in the food processing compartment and from computer 33 which provides information for temperature set points as a function of time to attain predetermined temperatures at predetermined times. The controller has outputs to electrically operated selector valves 35 and to electrically operated regulator valve 36.

Representative operation of the oven is described. Food is placed in the food processing compartment and the computer is programmed to include processing temperature and completion time. To provide low temperature storage, selector valves 35 are in the position shown, regulator valve 36 is open, and pump 17A is operating. Thermal exchange fluid circulates in a closed path between heat exchanger 16A in the cold reservoir and enclosed chamber 23. When the temperature of the food processing compartment reaches a level determined by the computer, say 0° C., the regulator valve closes to stop flow of thermal exchange fluid. When the computer transmits a high temperature set point to the controller to begin a cooking phase, the controller provides power to turn the selector valves to direct flow of thermal exchange fluid through the ambient air heat sink to moderate the temperature of the oven to avoid unnecessary heating of cold thermal exchange fluid by the hot reservoir. The controller then provides power to turn the selector valves to direct flow of the thermal exchange fluid through the hot reservoir. The regulator valve modulates flow of thermal exchange fluid in response to the controller to maintain the temperature sensor at the level required by the computer. When the computer has determined that the cooking phase is complete and transmits a serving temperature set point to the controller, the controller provides power to turn the selector valves to direct flow of the thermal exchange fluid between the enclosed chamber and the ambient air heat sink to reduce oven temperature to the serving level set point. In warm weather, the ambient air heat sink exhausts oven heat outside to reduce kitchen heat load.

As an example of temperature levels which may be used in the appliance system, the cold reservoir may be designed for a stable temperature of −30° C. and the hot reservoir may be designed for a stable temperature of +300° C. An example of a liquid phase thermal exchange fluid suitable for operation between such temperatures is "Therminol 60" manufactured by the Monsanto Corporation. It is sufficient, however, for the method of this invention to cool the thermal exchange fluid sufficiently to store food for a convenient time and to heat the thermal exchange fluid sufficiently to cook the food by desirably altering its properties.

To the basic structure of a single enclosed chamber for receiving the hot and cold thermal exchange fluid and means for placing food separate from the enclosed chamber with both the enclosed chamber and food within the same food processing compartment, known apparatus may be combined for advantage. As an example, a microwave generator may be added to more rapidly increase temperature within the food. Additionally, a fan may be added to provide more rapid heating of the food surface. Further, a source of vapors or gases may be added such as water vapor to retard loss of water or nitrogen to reduce oxidation of the food.

What I claim is:

1. A method for refrigerating food in an oven for subsequent cooking, said oven having a food processing compartment and a single enclosed chamber in said food processing compartment, said enclosed chamber receiving a single substance liquid thermal exchange fluid at hot and cold temperatures comprising the steps of placing food in the food storage compartment separate from the enclosed chamber, cooling the thermal exchange fluid by a cold source separate from the oven, causing the cold thermal exchange fluid to flow through the enclosed chamber to thereby cool the food processing compartment for a predetermined time to preserve properties of the food, stopping flow of the cold thermal exchange fluid through the enclosed chamber, heating the thermal exchange fluid to a hot oven temperature by a hot source separate from the oven, causing the hot thermal exchange fluid to flow through the enclosed chamber for a predetermined time to thereby heat the food processing compartment to cook the food by desirably and nonreversibly altering properties of the food by thermal processes, said enclosed chamber exchanging heat with said food by gases moving within the food storage compartment between the enclosed chamber and the food.

2. The method of claim 1 wherein said hot oven temperature exceeds 275° F.

3. The method of claim 1 wherein temperature of the food storage compartment is controlled by regulating flow of the thermal exchange fluid through the enclosed chamber.

4. The method of claim 3 wherein the steps of causing cold and hot thermal exchange fluid to flow through the enclosed chamber include operating selector valves in response to temperature set points to connect the enclosed chamber alternately to a source of cold thermal exchange fluid under a differential pressure and to a source of hot thermal exchange fluid under a differential pressure.

5. Apparatus for storing food at low temperature to preserve properties of the food and for processing the food at high oven temperature to cook the food comprising a thermally insulated food processing compartment, single enclosed chamber within the food processing compartment for exchanging heat therewith, said enclosed chamber receiving a liquid thermal exchange fluid, said thermal exchange fluid being a single substance varying in temperature, means separate from the food processing compartment to cool the thermal exchange fluid to provide a body of cold thermal exchange fluid, means to deliver the body of cold thermal exchange fluid under pressure to the enclosed chamber, means separate from the food processing compartment to heat the thermal exchange fluid to a hot oven temperature to provide a body of hot thermal exchange fluid, means to deliver the body of hot thermal exchange fluid under pressure to the enclosed chamber, means to select the body of cold thermal exchange fluid or flow through the enclosed chamber to cool the food processing compartment for a predetermined time thereby preserving the properties of food contained therein, means to stop flow of the body of cold thermal exchange fluid through the enclosed chamber, means to select the body of hot thermal exchange fluid for flow through the enclosed chamber to heat the food processing compartment for a predetermined time thereby cooking the food contained therein, means to stop flow of the body of hot thermal exchange fluid through the enclosed chamber, means to support the food in the food processing compartment separate from the enclosed chamber, said food heated and cooled by gases moving within the food processing compartment.

6. The apparatus of claim 5 wherein flow of said hot and cold thermal exchange fluid through the enclosed chamber is regulated by means responsive to temperature within the food processing compartment to regulate temperature therein to predetermined levels.

7. The apparatus of claim 5 wherein said means to heat the thermal exchange fluid heats the body of hot thermal exchange fluid to temperatures exceeding 275° F.

8. The method of claim 7 wherein said altering of properties of the food includes browning of surfaces of the food.

9. The method of claim 8 wherein the cooking comprises roasting and baking.

* * * * *